Oct. 25, 1966  J. M. SHELLY  3,280,762
LIQUID MOLDING MACHINE
Filed July 12, 1963  2 Sheets-Sheet 2
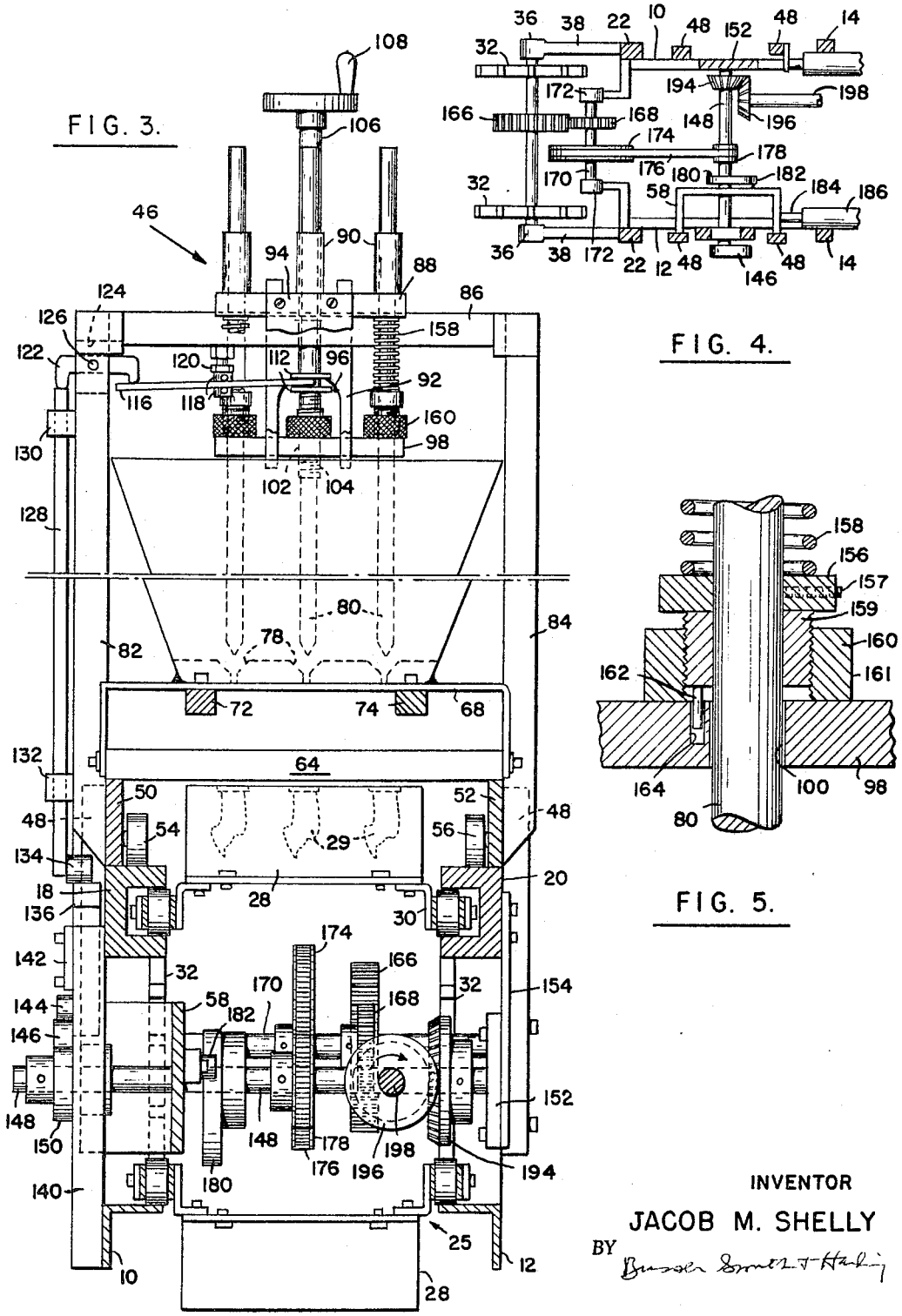
INVENTOR
JACOB M. SHELLY
BY
ATTORNEYS

United States Patent Office 3,280,762
Patented Oct. 25, 1966

3,280,762
LIQUID MOLDING MACHINE
Jacob M. Shelly, Lansdale, Pa., assignor to Shelly Brothers, Inc., Lansdale, Pa., a corporation of Pennsylvania
Filed July 12, 1963, Ser. No. 294,491
6 Claims. (Cl. 107—8)

The present invention relates to a machine for dispensing hot candy syrup into molds carried by a conveyor and, more particularly, the present invention relates to an improved molding machine of the general type disclosed in my prior Patent No. 2,868,242, issued January 13, 1959.

In general, the present invention is similar to that disclosed in the above mentioned patent in that both machines employ a horizontally moving conveyor and a vertically arranged dispenser which reciprocates in a direction parallel to the movement of the molds carried by the conveyor, the discharge of the syrup from the dispenser being controlled by a plurality of adjustable valves. However, the present invention departs from that disclosed in the prior patent in that a simplified drive mechanism is provided for synchronizing the movements of the dispenser with those of the mold conveyor. In addition, the present invention provides for individual adjustment of each valve in addition to adjustment of the entire set of valves so that a more accurate quantity of syrup may be dispensed into each mold.

It is therefore the principal object of the present invention to provide a liquid molding machine having the above advantages of construction and operation, these advantages becoming more fully apparent from the following description taken with the accompanying drawings in which:

FIGURE 3 is a sectional view of the machine taken along the plane indicated by line 3—3 of FIGURE 1;

FIGURE 4 is a simplified diagram of the drive mechanism of the machine; and

FIGURE 5 is an enlarged, fragmentary view showing the details of the individual valve adjusting mechanism.

Figure 2:
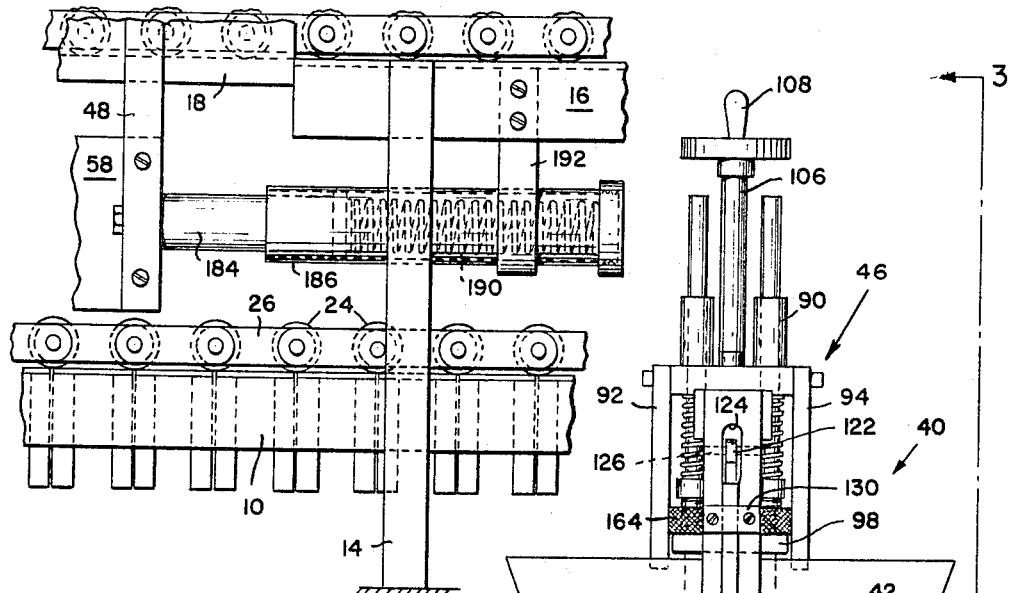
FIGURE 2 is a side elevational view showing an additional portion of the machine located to the right of the portion illustrated in FIGURE 1.
Figure 1:
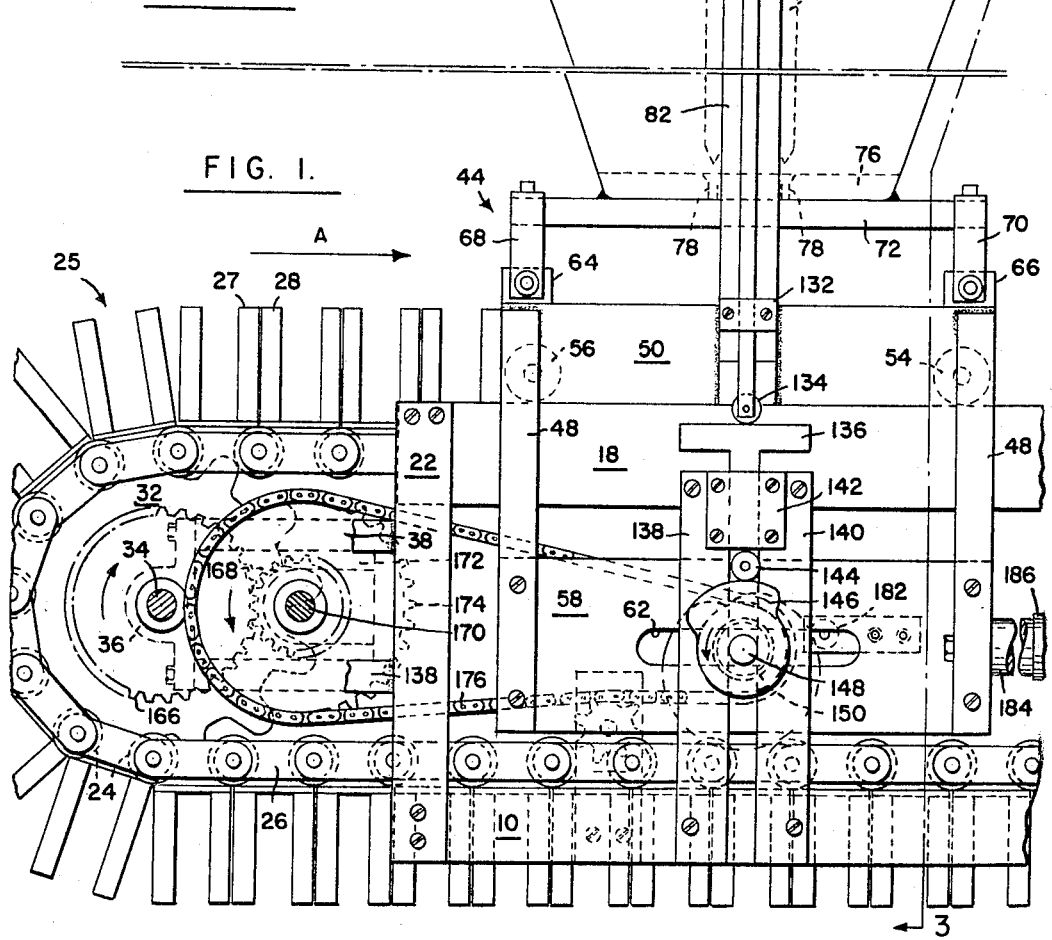
FIGURE 1 is a side, elevational view of the dispenser and mold conveyor comprising the major portion of the complete molding machine.

Referring first to FIGURES 1–4, the machine includes a stationary frame formed by a pair of horizontally extending, laterally spaced members 10 and 12 having L-shaped cross-sections which are supported by a plurality of horizontally spaced legs 14 one of which is shown in FIGURE 2 and two of which are shown in FIGURE 4. Legs 14 also support a second pair of horizontally extending members 16 which terminate slightly beyond the leg 14. To the ends of members 16 are welded a pair of laterally spaced, C-shaped members 18 and 20 the opposite ends of which are supported by a pair of vertical supports 22 connected to members 10 and 12 as shown in FIGURE 1.

Members 10 and 12 serve to support the lower reach of a conveyor generally indicated by numeral 25 while members 16, 18 and 20 similarly support the upper reach of the conveyor. Conveyor 25 is of the link type having rollers 24 interconnected by links 26. A plurality of mold halves 27, 28 are secured to each link and roller assembly by means of brackets 30 so that each pair form a closed mold containing three laterally spaced cavities 29 so long as the conveyor moves in a linear path over the above described frame members.

As further shown in FIGURES 1 and 4, the end of the conveyor is trained about a pair of sprockets 32 carried by a shaft 34 which is journalled for rotation in support bearings 36. Bearings 36 are supported by braces 38 extending horizontally from vertical supports 22 to which they are rigidly secured as by welding. It will therefore be apparent that the reach of the conveyor moves in the direction indicated by arrow A and it is to be understood that the conveyor is driven directly by an electric motor (not illustrated).

Reference is now made to the dispensing mechanism generally indicated by numeral 40 which includes a hopper 42, a carriage assembly 44, and a valve assembly 46. Carriage assembly 44 includes four vertically extending bars 48 the upper ends of which are rigidly connected to horizontally extending plates 50 and 52 positioned on laterally opposite sides of the machine. Plates 50 and 52 respectively carry pairs of rollers 54 and 56 which rest upon the upper surfaces of C-shaped members 18 and 20, respectively. The lower ends of bars 48 slide over the outer, vertical surfaces of members 18 and 20 so as to prevent lateral shifting of the carriage. The pair of bars on the side of the machine shown in FIGURE 1 are interconnected by a plate 58 which is of U-shaped cross-section as shown in FIGURE 4.

The upper portion of the carriage assembly includes a pair of laterally extending braces 64 and 66 which are secured to the upper edges of plates 50 and 52. In turn, these braces support a pair of U-shaped brackets 68 and 70 from which there depends a pair of horizontally extending supports 72 and 74 which support hopper 42.

Hopper 42 is adapted to contain the hot candy syrup and it is to be understood that the hopper may be provided with heating coils (not illustrated) in the walls thereof so as to maintain the temperature of the syrup during extended periods of operation. The bottom of the hopper is provided with a relatively thick plate 76 having six tapered outlet passages 78 which are arranged in a horizontal array so as to become simultaneously aligned with the three cavities 29 in each of two adjacent molds.

The flow of syrup through passages 78 is controlled by a set of six vertically extending valves 80 forming a portion of the complete valve assembly 46. The valve assembly also includes a pair of vertically extending supports 82 and 84 the lower ends of which are secured to plates 50 and 52 as by welding. The upper ends of the supports are interconnected by a laterally extending brace 86 to which there is rigidly secured a platform member 88 which includes a set of six sleeves 90 for guiding the vertical movements of the valves 80 extending therethrough. Platform 88 also supports the upper ends of a pair of depending guides 92 and 94 each of which is provided with an enlarged cut-out portion 96. Guides 92 and 94 serve to guide the vertical movement of a second platform member 98. Platform member 98 is provided with six bores 100 through which the valves 80 may vertically slide and the platform member further includes a central aperture 102 which is threaded so as to receive the threaded portion 104 of a vertically extending shaft 106. Shaft 106 passes freely through an aperture in upper platform member 88 and terminates in a handle 108 whereby the shaft may be rotated.

Immediately above threaded portion 104, shaft 106 carries a pair of integral flanges 112 which engage the bifurcated end of a lever 116. The mid-portion of lever 116 is supported between a pair of pins 118 secured to a lug 120 depending from brace 86, pins 118 forming fulcrum points for pivotal movement of the lever. The opposite end of lever 116 is engaged by one end of a link 122 which passes through an aperture 124 in support 82 and which is pivoted in the aperture by a pin 126. The opposite end of link 122 engages the upper end of an actuating bar 128 which is mounted for vertical reciprocation by a pair of guide blocks 130 and 132 rigidly secured to support 82. The lower end of actuating bar 128 carries a roller 134 which engages the upper surface of a T-shaped slide 136 mounted for vertical reciprocation between vertical guides 138, 140 and a plate 142 extending thereacross. The upper ends of guides 138 and 140 are secured to upper frame member 18 and the lower ends of the guides are secured to lower frame member 10 so that slide 136 is limited to vertical reciprocation.

The lower end of slide 136 carries a cam follower 144 engaging a cam 146 carried by a laterally extending shaft 148 one end of which is journalled for rotation in a bearing 150 secured between guides 138 and 140. The opposite end of shaft 148 is journalled for rotation in a plate 152 secured to frame member 20 by a depending bracket 154, as shown in FIGURES 3 and 4.

From the foregoing description it will be apparent that rotation of cam 146 produces reciprocation of slide 136 and actuating bar 128 so as to pivot link 122 and lever 116 thereby vertically reciprocating shaft 106 and platform member 98.

The connection of platform member 98 to each of valves 80 will now be described with particular reference to FIGURES 3 and 5. This connection includes abutment collars 156 secured to each of valves 80 by set screws 157 and compression springs 158 which are interposed between platform member 88 and each abutment collar so as to bias the valves downwardly. Immediately below the collars 156, each valve extends through an externally threaded sleeve 159 which, in turn, is surrounded by an internally threaded adjustment ring 160 having a knurled external surface 161. Each of sleeves 159 includes a depending pin 162 which is received in a bore 164 provided in platform member 98 so as to prevent rotation of the sleeve. It will therefore be apparent that rotation of individual adjustment rings 160 produces vertical movement of sleeves 159, collars 156 and the associated valves so that each valve may be individually adjusted while vertical movement of platform member 98 by lever 116 produces reciprocation of all valves simultaneously. Reference is now made to the drive connections between conveyor 25 and both the carriage assembly 44 and valve assembly 46 as shown most clearly in FIGURES 1 and 4. Shaft 34 which carries the previously mentioned sprockets 32 driving the conveyor also carries a drive gear 166 in meshing engagement with a driven gear 168. Gear 168 is carried by a shaft 170 journaled in bearings 172 secured to frame member 22. Shaft 170 also carries a sprocket 174 which drives a chain 176 trained about a driven sprocket 178 carried by the previously mentioned cam shaft 148. In addition to driving cam 146 which actuates the valve assembly, shaft 148 also carries a heart-shaped cam 180 which engages a cam follower 182 secured to plate 58. Thus, rotation of cam 180 moves the carriage forwardly in the direction of arrow A which is the direction of conveyor movement.

In order to reciprocate the carriage in the opposite direction, plate 58 is secured to a plunger 184 which is slidably received in a cylinder 186 containing a compression spring 190, cylinder 186 being stationarily secured to frame member 16 by a bracket 192 and further supported by a welded connection to leg 14. On the opposite side of the machine as shown in FIGURE 4, the carriage bar 48 is connected to a second plunger 184 received in a second cylinder 186 having an internal compression spring identical to spring 190. Thus, springs 190 return the carriage to the left as viewed in the drawings and maintain cam follower 182 in engagement with cam 180.

In FIGURE 4 it will also be noted that shaft 148 carries a beveled gear 194 engaging a second beveled gear 196 which drives a shaft 198. The purpose of shaft 198 is to provide a synchronized drive for operating additional machines on the assembly line such as the stick inserting machine described in copending application Serial No. 294,548, filed July 12, 1963, now Patent 3,221,673, dated December 7, 1965.

Prior to the operation of the machine, shaft 106 is manually rotated so that valves 80 close passages 78 so long as cam follower 134 is engaged by the circular portions of cam 146. Hopper 42 is then filled with candy syrup and the conveyor motor is actuated so as to drive the conveyor and cam shaft 148 through the above described driving connection. Of course, it is to be understood that the angular position of cam 180 is initially set with respect to sprockets 32 such that a pair of molds are directly aligned with apertures 78 during the forward movement of the carriage assembly. Similarly, the angular position of cam 146 is initially set such that the leading edge of the cam lobe engages follower 144 just as cam 180 begins to move the carriage forwardly. Thus, the upward movement of actuating bar 128 causes counterclockwise movement of lever 116 about pins 118 so that shaft 106, platform 98 and all of the valves are simultaneously raised thereby permitting the syrup to flow through passages 78 into the respective cavities 29 as the hopper moves in the same direction and at the same speed as the molds. Conversely, springs 158 force the valves and platform member 98 downwardly upon continued rotation of cam 146 so that the valves are closed immediately prior to the time that the carriage assembly reaches its rightmost position. Thus, two molds are simultaneously filled and the carriage then moves to the left as viewed in FIGURE 1 under the biasing force of springs 190 so as to align passages 78 with the succeeding pair of molds and the cycle is then repeated.

During extended periods of operation in the manner just described, the tapered portions of passages 78 often become partially obstructed due to the buildup of partially solidified syrup and the amount of obstruction usually varies with each passage. This results in incomplete and unequal filling of the molds which is obviously undesirable. However, the present invention provides for elimination of this problem by permitting all of the valves to be raised a greater amount by rotation of shaft 106 and each valve may be individually adjusted by rotation of rings 160. Thus, the unequal obstruction of various of passages 78 may be compensated for and this results in equal and complete filling of each mold cavity.

From the foregoing description of the structure and operation it will be readily apparent that numerous modification and alterations may be made therein without departing from the scope of the following claims.

What is claimed is:

1. A liquid molding machine comprising a conveyor carrying molds, said molds having cavities into which candy syrup is to be dispensed, a hopper containing said syrup and having a plurality of outlet passages for dispensing said syrup, a platform member above said hopper, a stem valve controlling flow of liquid through each such passage and passing freely through an opening in said platform member, an externally threaded sleeve engaging each valve stem, means to prevent each sleeve from rotating, a nut threaded to each sleeve and adapted to engage the platform member, means including a spring to bias each stem valve, sleeve and nut downwardly towards the valve closed position, means to elevate the platform member against the bias of the means including a spring to open the valves, carriage means supporting said hopper for reciprocation parallel to the conveyor, means for advancing the carriage in the direction of conveyor movement at conveyor speed, and means for returning the carriage in the opposite direction.

2. A molding machine in accordance with claim 1 in which the means to prevent the sleeve from turning comprises a depending pin secured to the sleeve and engaging a bore in the platform member.

3. A molding machine in accordance with claim 1 in which the means to elevate the platform member includes cam means to elevate the platform member during movement of the carriage in the direction of conveyor movement.

4. A molding machine in accordance with claim 1 in which the means for advancing the carriage means includes a cam follower secured to the carriage means and a cam engaging said follower and the means for returning the carriage means comprises a spring.

5. A molding machine in accordance with claim 2 in which the means for advancing the carriage means includes a cam follower secured to the carriage means and a cam engaging said follower and the means for returning the carriage means comprises a spring.

6. A molding machine in accordance with claim 3 in which the means for advancing the carriage means includes a cam follower secured to the carriage means and a cam engaging said follower and the means for returning the carriage means comprises a spring.

References Cited by the Examiner
UNITED STATES PATENTS

| | | | |
|---|---|---|---|
| 1,223,293 | 4/1917 | Rose | 141—137 |
| 1,896,210 | 2/1933 | Vogt | 141—175 X |
| 2,868,242 | 1/1959 | Shelly | 141—137 |
| 3,191,643 | 6/1965 | Roth | 141—137 |

LAVERNE D. GEIGER, *Primary Examiner.*

E. EARLS, *Assistant Examiner.*